US008098129B2

(12) United States Patent
Falck et al.

(10) Patent No.: US 8,098,129 B2
(45) Date of Patent: Jan. 17, 2012

(54) IDENTIFICATION SYSTEM AND METHOD OF OPERATING SAME

(75) Inventors: Thomas Falck, Aachen (DE); Henning Maass, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1200 days.

(21) Appl. No.: 11/719,407

(22) PCT Filed: Nov. 10, 2005

(86) PCT No.: PCT/IB2005/053705

§ 371 (c)(1), (2), (4) Date: May 16, 2007

(87) PCT Pub. No.: WO2006/054211

PCT Pub. Date: May 26, 2006

(65) Prior Publication Data

US 2009/0121833 A1 May 14, 2009

(30) Foreign Application Priority Data

Nov. 16, 2004 (EP) .................................... 04105810

(51) Int. Cl.
*G05B 19/00* (2006.01)
*G06F 7/00* (2006.01)
*G08B 29/00* (2006.01)
*H04B 3/00* (2006.01)
*H04Q 1/00* (2006.01)

(52) U.S. Cl. ..................... 340/5.53; 340/5.83; 340/5.73; 340/573.1

(58) Field of Classification Search ................. 340/5.53, 340/5.83, 5.73, 825.69, 573.1; 342/357.07, 342/42, 44, 51; 341/33; 307/149; 382/115; 455/553.1, 41.1; 345/156, 157, 163
See application file for complete search history.

(56) References Cited

U.S. PATENT DOCUMENTS

| | | | | | |
|---|---|---|---|---|---|
| 3,564,501 | A | * | 2/1971 | Flook, Jr. | 340/5.64 |
| 4,591,854 | A | * | 5/1986 | Robinson | 340/5.65 |
| 5,053,608 | A | * | 10/1991 | Senanayake | 235/380 |
| 5,204,672 | A | * | 4/1993 | Brooks | 340/12.22 |
| 5,467,403 | A | * | 11/1995 | Fishbine et al. | 382/116 |
| 5,682,032 | A | * | 10/1997 | Philipp | 235/422 |
| 5,796,827 | A | * | 8/1998 | Coppersmith et al. | 713/182 |
| 5,811,897 | A | * | 9/1998 | Spaude et al. | 307/149 |
| 6,041,410 | A | * | 3/2000 | Hsu et al. | 713/186 |

(Continued)

FOREIGN PATENT DOCUMENTS

EP 0949578 A2 10/1999

(Continued)

OTHER PUBLICATIONS

Matsushita, N., et al.; Wearable Key: Device for Personalizing Nearby Environment; 2000; IEEE Trans. on 4th Int'l Symposium on Wearable Computers; pp. 119-126.

(Continued)

*Primary Examiner* — Nam V Nguyen

(57) ABSTRACT

An identification system which is not prone to man-in-the-middle attacks and which is capable of intra-body communication includes at least one wearable electronic key (1). The electronic key includes an intra-body communication interface (IBCI) and a storage device (DB) in which user identification data (ID) are stored, and an authentication server (AS) for verification of a user's fingerprint. At least one reader (2) has an intra-body communication interface (IBCI) and a fingerprint reader.

12 Claims, 1 Drawing Sheet

U.S. PATENT DOCUMENTS

| | | | | |
|---|---|---|---|---|
| 6,182,221 | B1 * | 1/2001 | Hsu et al. | 713/186 |
| 6,223,018 | B1 * | 4/2001 | Fukumoto et al. | 455/41.1 |
| 6,441,721 | B1 * | 8/2002 | Tajima et al. | 340/286.01 |
| 6,580,356 | B1 * | 6/2003 | Alt et al. | 340/5.8 |
| 6,636,144 | B1 * | 10/2003 | Hirakawa | 340/5.53 |
| 6,710,700 | B1 * | 3/2004 | Tatsukawa et al. | 340/5.53 |
| 6,754,472 | B1 | 6/2004 | Williams et al. | |
| 6,771,161 | B1 * | 8/2004 | Doi et al. | 340/5.64 |
| 6,859,657 | B1 * | 2/2005 | Barnard | 455/575.6 |
| 6,864,780 | B2 * | 3/2005 | Doi et al. | 340/5.64 |
| 6,957,771 | B2 * | 10/2005 | Norris, Jr. | 235/382 |
| 7,084,734 | B2 * | 8/2006 | Singh | 340/5.2 |
| 7,202,773 | B1 * | 4/2007 | Oba et al. | 340/5.8 |
| 7,543,755 | B2 * | 6/2009 | Doi et al. | 235/492 |
| 2002/0084904 | A1 | 7/2002 | De La Huerga | |
| 2003/0011758 | A1 * | 1/2003 | Ochiai | 356/71 |

FOREIGN PATENT DOCUMENTS

| | | | |
|---|---|---|---|
| EP | 1033687 | A2 | 9/2000 |
| GB | 2359397 | A | 8/2001 |
| JP | 2003132031 | A | 5/2003 |
| JP | 2004088223 | A | 3/2004 |

OTHER PUBLICATIONS

Partridge, K., et al.; Sending Signals Through Skin: Applications and Advantages; http://www.cs.washington.edu/research/portolano/.

* cited by examiner

IDENTIFICATION SYSTEM AND METHOD OF OPERATING SAME

FIELD OF THE INVENTION

The invention relates to an identification system capable of intra-body communication.

The invention further relates to a wearable electronic key for use in the identification system according to the first paragraph.

The invention further relates to a reader for use in the identification system according to the first paragraph.

The invention further relates to a method of operating an identification system capable of intra-body communication.

BACKGROUND OF THE INVENTION

The continuing miniaturization of electronic circuits in recent years has resulted in many new applications for electronic circuits as more and more complex electronic circuits can be accommodated in ever more decreasing space. Also identification systems have undergone significant changes due to the progress in the VLSI of electronic circuits. Moreover, two new concepts have recently been introduced for improving identification systems.

The first one is the idea of a wearable electronic key, which is described in an article by Noboyuki Matushita, Shigeru Tajima, Yuji Ayatsuka, Jun Rekimoto with the title “Wearable Key: Device for Personalizing nearby Environment” which was presented on the Fourth International Symposium on Wearable Computers (ISWC 2000).

The second one is the so-called intra-body communication, which is in general described in an article by Kurt Partridge, Mike Sinclair, Gaetano Boriello, Turner Whitted titled “Sending Signals through Skin: Applications and Advantages”. U.S. Pat. No. 6,754,472 discloses a communication system that uses capacitive coupling to transmit power and data through a user’s body.

With respect to a clinical environment, there has always been the need for a reliable patient identification system. Such system for automatic, continuous and reliable electronic patient identification has been developed by combining these new concepts which allows a body-worn identification device that continuously broadcasts the patient identifier through intra-body communication. According to this electronic patient identification system, a patient wears an electronic key containing identification data ID which are transmitted via intra-body communication when the patient gets into contact with a target device so that a capacitive coupling is possible. The wearable electronic key containing the identification data of the patient can be integrated in, for example, a wristwatch of the patient is wearing, which provides a direct contact of the key with the patient’s skin.

Wearable electronic ID keys in conjunction with intra-body communication enable users to authorize themselves in a convenient and intuitive way. The wearable key regularly transmits the user’s ID through the human body. Thereby all devices in contact with the user’s body can receive the user’s ID. This enables users to personalize a device or to authorize, for example, a payment simply by touch.

Although intra-body communication is relatively secure against eavesdropping since the communication is restricted to the human body (contrary, for example, to radio communication with a range of a typically 10 meter (Bluetooth) to 50 meters (wireless LAN)), there is a weak point: an intruder can pretend to be someone else by simply touching (or even just coming very close (e.g. 5 cm) to his victim and touching the target device he wants to deceive. This deceit is called “man-in-the-middle attack”.

Therefore, without counter measures, the wearable electronic key concept is not acceptable for access control, authorizing payment and business transactions and the like.

SUMMARY OF THE INVENTION

It is therefore an object of the invention to provide an identification system defined in the first paragraph and a method of operating an identification system as defined in the fourth paragraph, in which the disadvantages defined above are avoided.

In order to achieve the object defined above with an identification system according to the invention characteristic features are provided so that a system according to the invention is characterized as defined below that is:

Identification system capable of intra-body communication comprising at least one wearable electronic key having an intra-body communication interface and storage means wherein user identification data are stored, and at least one reader having an intra-body communication interface, wherein the identification system comprises means for verification of a user’s fingerprint.

In order to achieve the object defined above with a wearable electronic key according to the invention, characteristic features are provided so that a wearable electronic key according to the invention is characterized defined below that is:

Wearable electronic key for use in an identification system capable of intra-body communication comprising an intra-body communication interface, storage means and verification means for a user’s fingerprint detected and transmitted by a reader of the identification system.

In order to achieve the object defined above with a reader according to the invention, characteristic features are provided so that a reader according to the invention is characterized defined below that is:

Reader for use in an identification system capable of intra-body communication comprising an intra-body communication interface and a fingerprint sensor for detection of a fingerprint of a user having a wearable electronic key.

In order to achieve the object defined above with a method of operating an identification system according to the invention, characteristic features are provided so that a method according to the invention can be characterized in the way defined below that is:

Method of operating an identification system capable of intra-body communication consisting of at least one wearable electronic key and at least one reader, which method comprises the following steps:

a) detecting a fingerprint template of the user using a fingerprint sensor of the reader;
b) transmitting the detected fingerprint template from the reader to a wearable electronic key of the user via intra-body communication;
c) verifying the transmitted fingerprint template within the wearable electronic key;
d) transmitting identification data of the user from the wearable electronic key to the reader via intra-body communication upon a successful verification of the user’s fingerprint.

The characteristic features according to the invention provide the advantage that an identification system and a wearable electronic key and a reader and a method of operating same make use of the advantages of an intra-body communication during identification and in addition provides protection against misuse by, for example, man-in-the-middle attacks. Furthermore, the identification system and the method of operating same according to the invention broadens the scope of application of wearable electronic keys to areas with high security demands such as applications related to payments, access control and digital rights management (DRM) and the like.

Some embodiments according to the present invention in which a reader comprises a fingerprint sensor offer the advantage that a very cost-effective and simple implementation of the identification system according to the invention is achieved.

Some embodiments according to the present invention in which encryption of the intra-body communication data is carried out offer the advantage of an enhanced protection against eavesdropping.

Some embodiments according to the present invention in which the wearable key is capable of distinguishing between the fingers of the user for verification offer the advantage that an additional control between different actions for an application to be authorized by the user is available.

Some embodiments according to the present invention in which the wearable key comprises an intra-body communication interface, storage means and verification means offer the advantage of a wearable electronic key which can be effectively used in the identification system according to the invention.

Some embodiments according to the present invention provide the advantage of a reader, which, can be effectively used in the identification system according to the invention.

BRIEF DESCRIPTION OF THE DRAWINGS

The aspects defined above and further aspects of the invention are apparent from the examples of the embodiments to be described hereinafter and are explained with reference to the examples of the embodiments to which the invention is not limited, however.

DESCRIPTION OF PREFERRED EMBODIMENTS

To achieve the above-identified object, the wearable electronic key concept is complemented by adding fingerprint verification to it. In this way, it is ensured that the user gets authorized only when he himself touches the target device which carries out a desired application.

Figure 1:
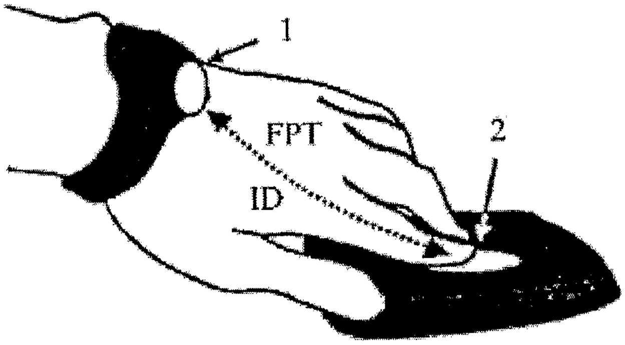
FIG. 1 shows the basic concept of the invention in the form of a schematic illustration.

Referring to FIG. 1, the system is mainly comprised of a wearable electronic key 1, which in this embodiment is implemented as a part of a wristwatch and a target device which is a reader 2 capable to receive the identification data ID of a user via intra-body communication using, for example, capacitive coupling of an AC through the user's skin and metal plates. The reader 2 further comprises not only an electrode for the intra-body communication but also a fingerprint sensor which is able to detect the fingerprint of the user and to provide a fingerprint template FPT of the scanned fingerprint. The wearable electronic key 1 has storage means into which identification data ID of the user together with a fingerprint template of the user are stored. Contrary to prior art as described above, the identification data (ID) is not periodically broadcast.

Moreover, the secure wearable electronic key 1 according to the invention comprises means for verification of the users fingerprint template. The user's ID is only transmitted to the reader 2 if the fingerprint of the person touching the reader 2 has been successfully verified so that the user has not only identified himself to the reader but has also been authorized to it. Thereby, man-in-the-middle attacks are prevented and the scope of application of wearable electronic keys is extended to areas of high security requirements.

Figure 2:
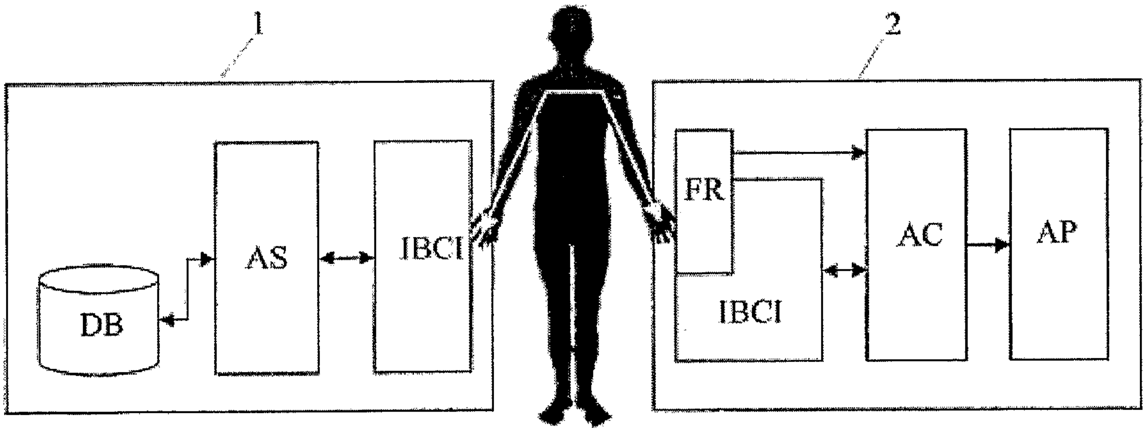
FIG. 2 shows an identification system according to an embodiment of the invention in the form of a block diagram.

Referring to FIG. 2, a detailed description of a preferred embodiment of the identification system according to the invention is given as follows:

The wearable electronic key 1 (in the following also referred to as secure wearable key or SWK) is an electronic circuit consisting of an authentication server AS for verifying that the fingerprint just scanned and submitted by the reader 2 matches the user's reference fingerprint template. Upon successful verification, the user's ID is then transmitted through intra-body communication to the target device containing some logic or application, for example, a door-opening device or a keyboard locking device. The authentication server AS may be a program running on a micro computer or may be an ASIC. The SWK 1 further comprises a data base DB as storage means which contain the user's ID and one or more user's reference fingerprint templates. Finally, the SWK 1 comprises an intra-body communication interface IBCI enabling the SWK 1 to transmit and receive signals through the human body.

The reader 2 is also an electronic circuit, which may include a microcomputer or any other program executing circuit, respectively, or an ASIC. The reader 2 comprises an authentication client AC which is able to request authentication of a user by sending the scanned fingerprint template to the AS. In case of approval, the AC informs an application AP connected thereto about the user's identity. The reader 2 further comprises a fingerprint reader FR that scans the user's finger after being touched and transmits the scanned fingerprint template to the AC. The reader 2 also comprises an intra-body communication interface IBCI enabling the reader 2 to transmit and receive signals through human body. The reader 2 can be connected to an application AP which uses the user's identity for personalization and/or approval of transactions. In principle, any application which needs authorization of the user requesting its use is conceivable.

The identification system according to the invention has to be initialized before it can be used for the first time. To this end the user has to perform a registration step in which the user's ID and the user's fingerprint template is stored in the data base DB of the wearable electronic key 1.

In the following, a method of operating the identification system according to the preferred embodiment is described.

In a first step, the user touches the fingerprint reader FR of the reader 2. Next, the fingerprint reader FR generates a fingerprint template from the scanned fingerprint image and transmits the fingerprint template within the reader 2 to the AC. The AC in turn sends the fingerprint template through the intra-body communication interface IBCI and through the human body of the user who touches the fingerprint reader to the AS. To this end, the fingerprint template is transmitted through the user's body to the SWK 1. Upon receipt of the fingerprint template, the AS starts the verification procedure. The AS therefore retrieves as a reference the user's stored fingerprint template along with the user's ID from the data base DB. Upon successful verification of the received fingerprint template with the reference fingerprint template, the AS sends the ID through the intra-body communication interface IBCI of the SWK 1 to the AC. The ID is transmitted through the user's body to the reader 2 and received by the intra-body communication interface IBCI of the reader 2. The IBCI forwards the received user's ID to the authentication client AC which in turn informs the application about the ID of the user.

In this way, a very simple and efficient system for authorizing an application with high security requirements can be implemented, which is not prone to man-in-the-middle attacks or eavesdropping.

To further enhance the identification system according to the invention, all data transmitted through intra-body communication between the SWK 1 and the reader 2 can be encrypted, which makes it even more difficult to eavesdrop the user's ID and scanned fingerprint templates. To this end, any method for encryption is conceivable.

In a further embodiment of the invention, the identification system is able to distinguish between the fingerprints of different fingers of a user and to perform different actions depending on which finger the user has used for touching the reader. To this end, the storage means DB of the SWK 1 stores reference finger templates of more than one finger and upon successful verification of a received fingerprint template of the user, an additional information can be sent to control the application according to the finger with which the user touched the reader 2. For example, touching the identification reader of a door with the forefinger could mean "open the door" while the thumb is used for "locking the door".

The invention can be applied to all areas where a user identification or authentication is required. Therefore, the wearable secure key can partly be used as a substitute for applications using today's RFID, smart card or Near Field Communication technology.

In addition, the invention can be used for enabling that everything a user touches is automatically personalized, configured and granting him access rights.

This includes personalization of CE devices, log-in systems for computer networks, transaction and payment systems (e.g. public transport), access control for dangerous devices such as pistols (child guard), theft protection, loss protection, easy access, intuitive user interface, DRM (song is played only if the user has the right), easy data transfer between devices and the like.

It has to be appreciated that the reference signs within the claims are only given for illustrative purposes and shall not be construed as limiting the scope of the method for which protection is sought.

It has to be stated that the verification of a user's fingerprint in the wearable electronic key could also be done by simply comparing fingerprint data representing the fingerprint template FPT that was already preprocessed by the reader in the way that a simple comparing process with fingerprint data in the electronic key is enabled. The wearable electronic key therefore does not need a special computing power.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An identification system for intra-body communication, comprising:

at least one wearable electronic key including:

a key intra-body communication interface for communicating over a user's body, a memory in which a user's identification data and a stored fingerprint template of at least one fingerprint of the user are stored, and an authentication server programmed to compare a candidate fingerprint template received over the user's body with the stored fingerprint template and in response to the received and stored fingerprint templates matching, sending the user's identification over the user's body; and at least one reader including:

a fingerprint reader which reads a fingerprint of a candidate finger and generates the candidate fingerprint template therefrom, and a reader intra-body communication interface over which the candidate fingerprint template is sent to the wearable electronic key and the user's identification is received.

2. The identification system according to claim 1, wherein the authentication server is further programmed to encrypt the user's identification data.

3. The identification system according to claim 1, wherein the memory of the wearable electronic key stores fingerprint templates for at least two fingers of the user and the authentication server sends an indication of which stored finger template matches the candidate fingerprint template along with the user's identification data.

4. A wearable electronic key for use in an identification system, the electronic key comprising:

an intra-body communication interface which sends and receives communications via a wearer's body;

a storage device which stores a wearer ID and at least one wearer fingerprint template; and a verification server which compares a candidate fingerprint template received from a reader via the intra-body communication interface and, in response to the candidate fingerprint template matching the wearer fingerprint template, sending the wearer ID via the intra-body communication interface to the reader.

5. A reader for use in an identification system, the reader comprising:

an intra-body communication interface which is touched by a user to be authenticated; and a fingerprint sensor which senses a fingerprint of a finger touching the intra-body communication interface and generates an electronic fingerprint template thereof, the electronic fingerprint template being sent via the intra-body interface to a wearable electronic key of the user;

the intra-body communication interface further receiving a user ID in response to the wearable electronic key authenticating the electronic fingerprint template.

6. A method of operating an identification system which includes at least one wearable electronic key and at least one reader, the method comprising:

a) generating a fingerprint template of a user using a fingerprint sensor of a reader;

b) transmitting the fingerprint template from the reader to a wearable electronic key over a body of the user;

c) verifying the transmitted fingerprint template within the wearable electronic key;

d) transmitting identification data of the user from the wearable electronic key over the user's body to the reader in response to verification of the transmitted fingerprint template within the wearable electronic key.

7. The method of operating an identification system according to claim 6, further including:

encrypting data transmitted over the user's body.

8. The method of operating an identification system according to claim 6, wherein in step c), the finger of the user corresponding to the transmitted fingerprint template is determined and wherein in step d), additional data associated with each finger of the user is transmitted with the identification data.

9. A method of providing authorized information comprising:

storing a fingerprint template on a wearable electronic key;

detecting a fingerprint with a reader and generating a candidate fingerprint template from the detected fingerprint;

transmitting the candidate fingerprint template to the electronic key via intra-body communication;

verifying within the electronic key the candidate fingerprint template is the same as the stored fingerprint template; and transmitting authorized information from the electronic key to the reader via intra-body communication upon successful verification.

10. The method of claim 9, wherein the information is encrypted.

11. The method of claim 9, further including:

determining which finger has been detected.

12. The method of claim 11, further including:

transmitting different information depending on which finger was detected.

* * * * *